United States Patent
Lee et al.

(10) Patent No.: US 9,323,083 B2
(45) Date of Patent: *Apr. 26, 2016

(54) DISPLAY DEVICE

(71) Applicant: LG DISPLAY CO., LTD., Seoul (KR)

(72) Inventors: Gyu-Ho Lee, Seoul (KR); Sang-Yeol Kim, Seoul (KR); Gee-Sung Chae, Incheon-si (KR); Jung-Hee Kim, Seoul (KR); Eun-Behm Kim, Gyeonggi-do (KR); Won-Bong Jang, Seoul (KR); Nam Ki, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 212 days.

This patent is subject to a terminal disclaimer.

(21) Appl. No.: 13/675,413

(22) Filed: Nov. 13, 2012

(65) Prior Publication Data

US 2013/0286624 A1   Oct. 31, 2013

(30) Foreign Application Priority Data

Apr. 26, 2012   (KR) .................... 10-2012-0043877

(51) Int. Cl.
*G02F 1/1333* (2006.01)
*H04N 5/64* (2006.01)

(52) U.S. Cl.
CPC ............ *G02F 1/133308* (2013.01); *H04N 5/64* (2013.01); *G02F 2001/13332* (2013.01); *G02F 2001/133328* (2013.01)

(58) Field of Classification Search
CPC ............... G02F 1/133308; G02F 2001/13332; G02F 2001/133328

USPC ................... 361/679.21; 349/58–60; 313/582
See application file for complete search history.

(56) References Cited

U.S. PATENT DOCUMENTS

| | | | |
|---|---|---|---|
| 3,703,431 A * | 11/1972 | Kemper | B44F 7/00 428/142 |
| 5,233,451 A * | 8/1993 | Iguchi | 349/160 |
| 5,398,128 A * | 3/1995 | Tajima et al. | 349/150 |
| 5,729,310 A * | 3/1998 | Horiuchi et al. | 349/62 |
| 6,549,263 B1 * | 4/2003 | Kim | 349/58 |
| 6,654,078 B1 * | 11/2003 | Kato et al. | 349/58 |
| 6,897,912 B2 * | 5/2005 | Kawakami et al. | 349/61 |

(Continued)

FOREIGN PATENT DOCUMENTS

| KR | 10-0827916 B | 5/2008 |
|---|---|---|
| KR | 10-2010-0063152 A | 6/2010 |

(Continued)

OTHER PUBLICATIONS

Communication dated Aug. 5, 2014 from the European Patent Office in counterpart European patent application No. 12007996.7.

*Primary Examiner* — Adrian S Wilson
(74) *Attorney, Agent, or Firm* — Morgan, Lewis & Bockius LLP

(57) ABSTRACT

A display device includes a display panel having a display area and a bezel area formed around edges of the display area; a backlight unit disposed on a rear side of the display panel to provide light to the display panel; a supporting member to support the display panel and the backlight unit; and a top case having at least one joint and incorporated with a surface of the supporting member, wherein the top case has a main frame combined with the supporting member, and a sub frame having a design of at least one color and disposed on the bezel area.

15 Claims, 5 Drawing Sheets

(56) References Cited

U.S. PATENT DOCUMENTS

| | | | |
|---|---|---|---|
| 6,967,701 B1* | 11/2005 | Kim | 349/122 |
| 7,113,237 B2* | 9/2006 | Nitto et al. | 349/58 |
| 7,209,195 B2* | 4/2007 | Lin | 349/58 |
| 7,218,521 B2* | 5/2007 | Kim | 361/704 |
| 7,324,172 B2* | 1/2008 | Yamazaki | 349/58 |
| 7,710,519 B2* | 5/2010 | Okuda | 349/110 |
| 7,883,252 B2* | 2/2011 | Matsui et al. | 362/612 |
| 8,975,540 B2* | 3/2015 | Mareno et al. | 174/559 |
| 2001/0010569 A1* | 8/2001 | Jin et al. | 349/58 |
| 2003/0043310 A1* | 3/2003 | Cho | 349/58 |
| 2003/0133070 A1* | 7/2003 | Nam et al. | 349/158 |
| 2003/0218700 A1* | 11/2003 | Tsukamoto | 349/58 |
| 2006/0055839 A1* | 3/2006 | Hirao et al. | 349/58 |
| 2006/0139271 A1* | 6/2006 | Okuda | 345/88 |
| 2006/0238446 A1* | 10/2006 | Takahashi et al. | 345/55 |
| 2006/0257624 A1 | 11/2006 | Naritomi et al. | |
| 2007/0008449 A1* | 1/2007 | Choi | 349/58 |
| 2008/0158468 A1* | 7/2008 | Kim et al. | 349/58 |
| 2009/0017242 A1* | 1/2009 | Weber et al. | 428/35.7 |
| 2009/0122475 A1* | 5/2009 | Kim | 361/679.21 |
| 2009/0147171 A1 | 6/2009 | Yang et al. | |
| 2009/0153768 A1 | 6/2009 | Ooami | |
| 2009/0274889 A1 | 11/2009 | Iwahashi et al. | |
| 2010/0045888 A1 | 2/2010 | Naritomi | |
| 2010/0079970 A1* | 4/2010 | Prest et al. | 361/807 |
| 2010/0097276 A1* | 4/2010 | Lin et al. | 343/702 |
| 2010/0159273 A1* | 6/2010 | Filson et al. | 428/653 |
| 2010/0253874 A1 | 10/2010 | Ito et al. | |
| 2011/0089792 A1* | 4/2011 | Casebolt | B29C 45/14311 312/223.2 |
| 2011/0250377 A1 | 10/2011 | Qin | |
| 2012/0008271 A1* | 1/2012 | Bhutani et al. | 361/679.31 |
| 2012/0250250 A1* | 10/2012 | Tatebe | 361/679.55 |

FOREIGN PATENT DOCUMENTS

| | | |
|---|---|---|
| KR | 10-0962884 B | 6/2010 |
| KR | 10-1048695 B | 7/2011 |

* cited by examiner

DISPLAY DEVICE

The invention claims the benefit of Korean Patent Application No. 10-2012-0043877 filed in Korea on Apr. 26, 2012, which is hereby incorporated by reference for all purposes as if fully set forth herein.

BACKGROUND OF THE INVENTION

1. Field of the Invention

The invention relates to a display device, and more particularly, to a display device including a case top with a main frame and a sub frame.

2. Discussion of the Related Art

Display devices encompass all devices for displaying images of display signals from outside, and include monitors receiving signals from personal computers and televisions receiving signals from broadcast stations. The display devices have been developed from cathode ray tubes (CRT) utilizing electrons emitted from the cathode in the vacuum to liquid crystal displays (LCD) utilizing variation of transmission degree of crystals according to the applied voltages, Plasma Display Panels (PDP) utilizing plasma phenomena, and so on. Display devices, such as LCDs and PDPs, have succeeded in accomplishing smaller thicknesses as compared to CRTs. By reducing weight and volume of displays, device size may be increased. In addition, research and development continues for enhancing response speed and display quality.

In recent years, with effort to technical aspects of the display, technical research for design is desired to attract customers and become one of main concerns. In this aspect, a bezel area between edges of the display panel to the active area for display is determinative.

Various methods have been suggested to reduce the bezel area and improve its design quality. FIG. 1 is a cross-sectional view illustrating a liquid crystal display (LCD) device according to the related art.

In FIG. 1, the display device 1 has a backlight unit 30 and a liquid crystal display panel 22. The backlight unit 30 and the liquid crystal display panel 22 are secured by a main support 41, a top case 10, and a bottom cover 42. The top case 10 is a single unit, and is a reversed L-shaped to cover the top surface and the side edges of the display device. The top case 10 defines a rectangular opening portion for displaying images of the display panel 22 and is fixed to the main support 41 or the bottom cover 42. To form the opening portion, it is required to cut a bigger sized metal plate, which increases material cost. Further since the top case 10 has narrow width, it is not sufficient to reinforce the display device 1.

To solve the above problem, Korean Patent No. 10-1048695 discloses a top case having a plurality of parts, one of which is hooked to a bottom through a hole. To mount the parts of the top case, an additional connection is needed on the top case and the bottom cover side. To strengthen the top case, similar to the related art top case, the top case must be elongated in the bezel area of the display panel.

SUMMARY OF THE INVENTION

Accordingly, the present invention is directed to a display device that substantially obviates one or more of the problems due to limitations and disadvantages of the related art.

An advantage of the present invention is to provide a display device including a bezel area where an improved sense of beauty can be admired.

Another advantage of the present invention is to provide a display device including separated top cases that are firmly fixed and can protect the display panel with high strength.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a display device includes a display panel having a display area and a bezel area formed around edges of the display area; a backlight unit disposed on a rear side of the display panel to provide light to the display panel; a supporting member to support the display panel and the backlight unit; and a top case having at least one joint and incorporated with a surface of the supporting member, wherein the top case has a main frame combined with the supporting member, and a sub frame having a design of at least one color and disposed on the bezel area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the present invention, examples of which are illustrated in the accompanying drawings. Same numerals represent substantially the same element throughout this specification. Concrete explanation of well known structure is omitted for avoiding unnecessary misunderstanding of this invention.

Figure 1:
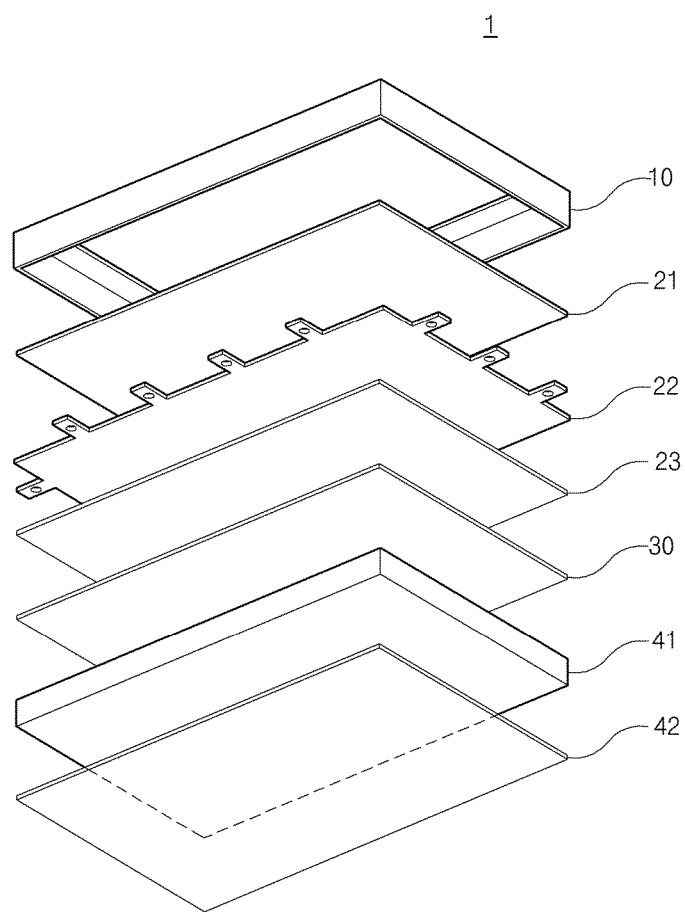
FIG. 1 is an exploded perspective view of illustrating a display device according to the related art.
Figure 2:
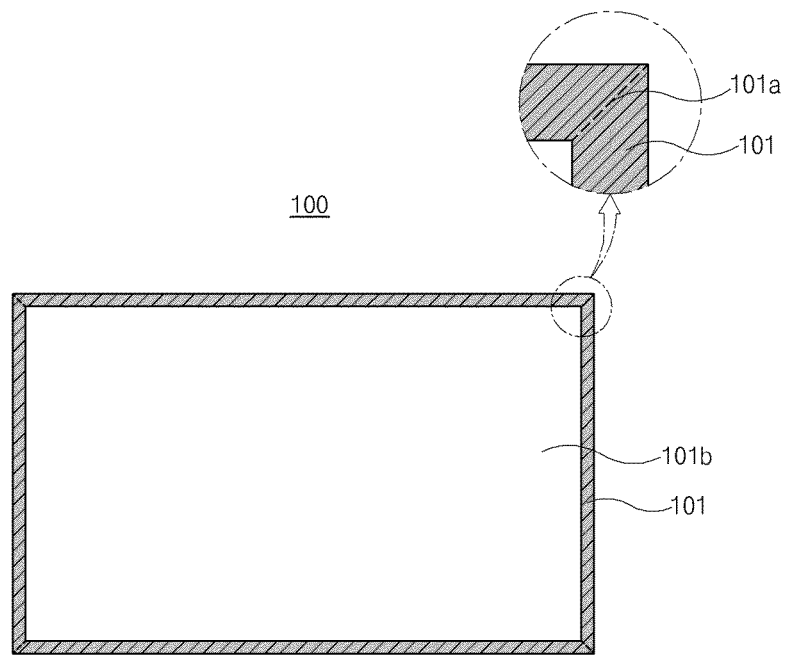
FIG. 2 is a top view of a top case of a display device according to an example of a first embodiment of the present invention.

FIG. 2 is a top view of a top case of a display device according to an example of a first embodiment.

As shown in FIG. 2, a top case 100 is made by connecting each metal plate which is separated from each other along the outlines of the top surface of the display device. Therefore, through the opening area 101b of the front surface of the top case 100, the image is displayed.

Here, the top case 100 has at least one joint portion 101a caused by separated metal plates, the joint portion 101a is firmly combined on the top surfaces of the metal plates by thermoplastic resin using an injection mold method, which completes one top case 100.

Therefore, it is possible to lower process cost by reducing wasted metal plates which occur during making the top case with one metal plate. Also, it is possible to prevent foreign substances from entering through the joint portion 101a of the separated metal plates.

Figure 3:
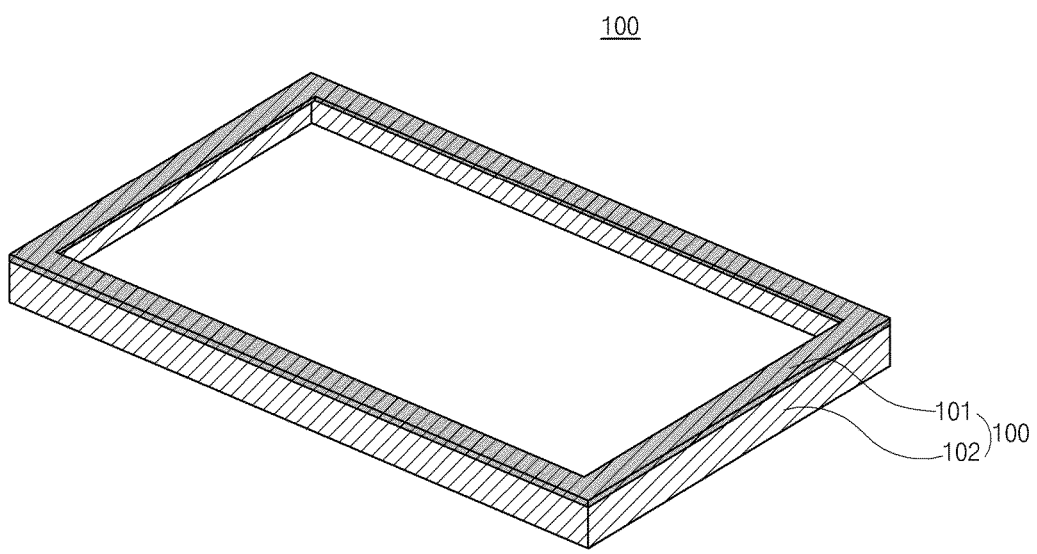
FIG. 3 is a schematic perspective view of the top case of FIG. 2.
Figure 4:
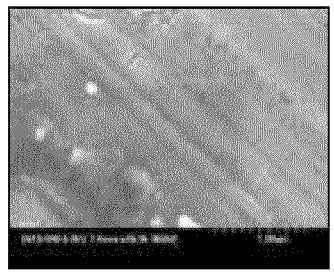
FIG. 4 is a photomicrograph of a main frame of the display device before surface treatment according to the first embodiment.

FIG. 3 is a schematic perspective view of the top case of FIG. 2. FIG. 4 is a photomicrograph of a surface of the main frame 102 of the display device before surface treatment according to the first embodiment, and FIG. 5 is a photomicrograph of a surface of the main frame 102 of the display device after surface treatment according to the first embodiment.

As shown in FIG. 3, the top case 100 is configured to cover the outlines of top and side surfaces of the display device. Here, the sub frame 101, which covers the outlines of the top surface of the display device, has one color and is made of thermoplastic resin. The main frame 102 is made of metal and has a patterned design on its surface.

The sub frame 101 and the main frame 102 are combined by the following processes.

Figure 5:
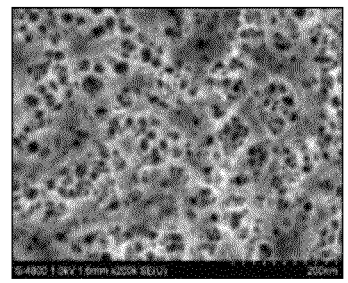
FIG. 5 is a photomicrograph of a main frame of the display device after surface treatment according to the first embodiment.

As shown in FIG. 5, the surface of the main frame 102 has minute uneven designs. The minute uneven designs are formed by a surface treatment process of the main frame 102.

The surface treatment process includes first and second pretreatment steps. The first pretreatment step uses alkaline aqueous solution of 0.1 to 10% concentration, which may include alkali metal hydroxide such as sodium hydroxide, potassium hydroxide and/or anhydrous sodium carbonate or ammonia. The second pretreatment step uses acid aqueous solution of 0 to 1% concentration, which may include acetic acid or hydrofluoric acid.

Instead of the first and second pretreatment steps, another pretreatment step can be adopted, where an aqueous solution of reducing agents of 1 to 5% concentration is applied for several minutes. The reducing agents may include alkali metal sulfite, alkali metal bisulphate, hydrazine ($N_2H_4$), sodium boron hydride ($NaBH_4$), lithium aluminum hydride ($LiAlH_4$), and so on.

After the pretreatment steps, the main frame 102 is treated by an aqueous solution selected at least one from ammonia ($NH_3$), hydrazine ($N_2H_4$), pyridine ($C_5H_5N$), hydrazine derivative, and aqueous amino compounds, which may be called a T-treatment step. The solution is of 2 to 30% concentration. The treatment can be done with a gas absorption method, or they can be immersed in the solution, or the solution can be sprayed to them.

Subsequently, a cleaning and drying step is performed.

Although a surface treatment process is illustrated as explained above, other methods for forming an uneven pattern or design can be adopted.

In succession, the thermo-plastic resin having at least one color is incorporated with the metal material, and the pattern of metal material is shown on the surface of the thermoplastic resin. Thus, the thermoplastic resin layer has a design. That is, by letting the pattern of the main frame 102 to be seen on the sub frame 101, the bezel area 200b of the display panel can have an improved sense of beauty or aesthetic.

The thermo-plastic resin may be Nylon (PA6,PA66,PP), polybuthlene terephthalate (PBT), polyphenylene sulfide (PPS), polymethyl methacrylate (PMMA), polycarbonate (PC), which may be used by itself or with organic or inorganic fillers having good coloring characteristics, or with an additive considering strength, thermal resistance, adhesion, electric characteristic.

For example, the inorganic filler can be glass fiber, carbon fiber, or metal fiber and the organic filler can be fluoride resin or acrylic resin. The additive can be flame retardant, coloring, antioxidant, parting agent, lubricant, or crystal accelerator, and so on according to the required performance.

Especially, according to the embodiment of the invention, pigment or dye is added to the thermoplastic resin. The pigment may be carbon black, titan white, chrome yellow, and the dye may be soluble dye such as oil yellow, oil blue, or oil red.

According to this example, the top case 100 is completed using four metal plates, but other numbers of the metal plates may be used. That is, this can be applied to top case of various structures, such as the metal plate having at least one joint portion.

Figure 6:
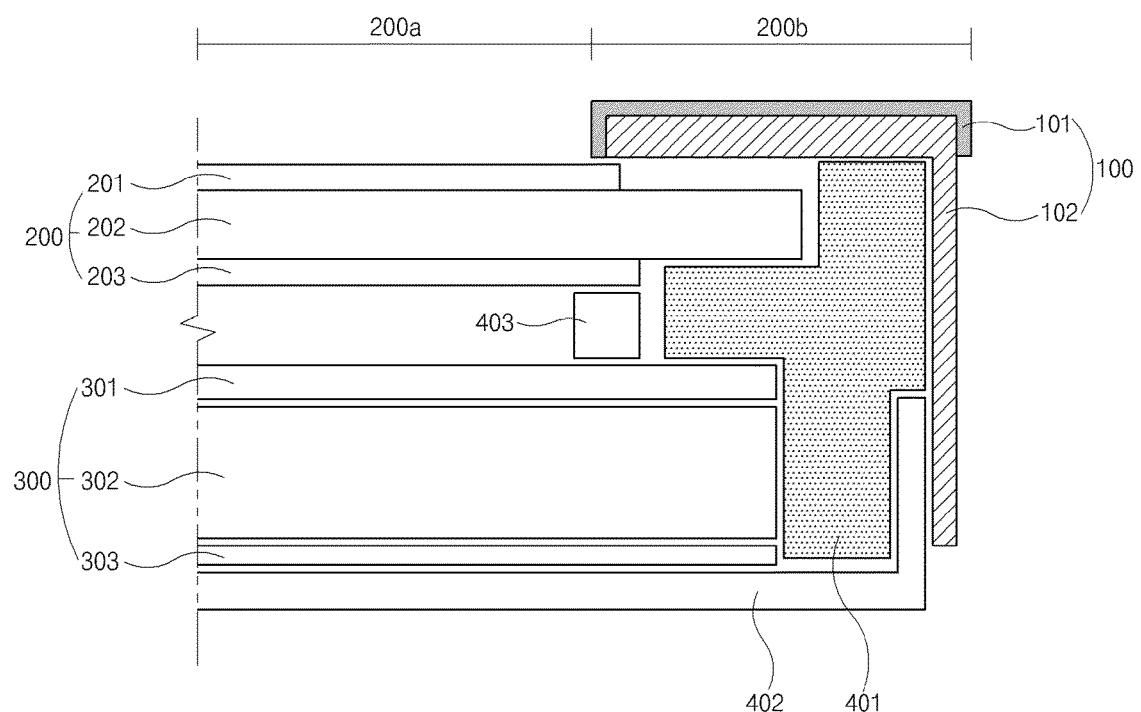
FIG. 6 is a cross-sectional view of the display device having the top case according to the first embodiment.

FIG. 6 is a cross-sectional view of the display device having the top case according to the first embodiment. As shown in FIG. 6, the display device has a display area 200a for displaying images, a display panel 200 having a bezel area 200b along the edges of the display area, a backlight unit 300 for supplying light to the display panel 200, supporting members 401 and 402 for supporting the display panel 200 and the backlight unit 300, and the top case 100 combined with the supporting members 401 and 402. The top case 100 has the main frame 102 combined with the supporting members 401 and 402, and the sub frame 101 having at least one color and pattern. The sub frame 101 is positioned on the bezel area 200b.

The display panel 200 has upper 201 and lower polarizers 203. The lower polarizer 203 selectively transmits linearly-polarized light from the backlight unit 300 to a panel 202 and the upper polarizer 201 selectively transmits linearly-polarized light from the display panel 202 to the outside.

The supporting members include a main support 401 and a bottom cover 402. The main support 401 surrounds and supports a side portion of the display panel 200 and the backlight unit 300. The bottom cover 402 covers the bottom portion and the side portion of the main support 401. The top case 100 surrounds the main support 401 and the bottom cover 402. The main support 401 can be formed by an injection molding method and may have stepped portions. The backlight unit 300 is provided at the lowest stepped portion, and the display panel 200 is positioned on the backlight unit 300.

The top case 100 has the sub frame 101 and the main frame 102, and may surround the top portion and the side portion of the main support 401 to support the display panel 200. As shown in FIG. 6, the sub frame 101 is positioned on the bezel area 200b and covers the top portion and the side portion of the main frame 102, which supports side portion of the display device. The main frame 102 can be straight-bar shaped or reversed L shaped.

To support the display device firmly, the thickness of the sub frame 101 is preferably constant. The sub frame 101 of thermoplastic resin has at least one color and a pattern on the bezel area 200b, without any other additional process, as explained above.

The backlight unit 300 has a lamp housing (not shown) including a light source (not shown), a light guide plate 302 for transferring light from the light source to surface light, optical sheets 301 for increasing the efficiency of the light towards the display panel 200, a reflector 303 for reflecting the light from the light guide plate 302 towards the display panel 200. The optical sheets 303 are attached to the light guide plate 302 and the reflector 303 is attached to the bottom surface of the light guide plate 302.

The light guide plate 302 provides uniform light distribution to the entire display device from the light source. The optical sheets 302 include diffusion sheets and prism sheets. The optical sheets 302 may diffuse or collimate light passing through the light guide plate 302 to improve uniformity and brightness of the planar light, thereby enlarging the viewing angle.

In FIG. 6, though a pad 403 is disposed near the main support 401, the position can be changed. For example, it can be positioned on the sides of the top case 100 or bottom cover 402. The pad 403 may be a silicon pad for releasing pressure or impact. The pad 403 may also protect against dust.

Figure 7:
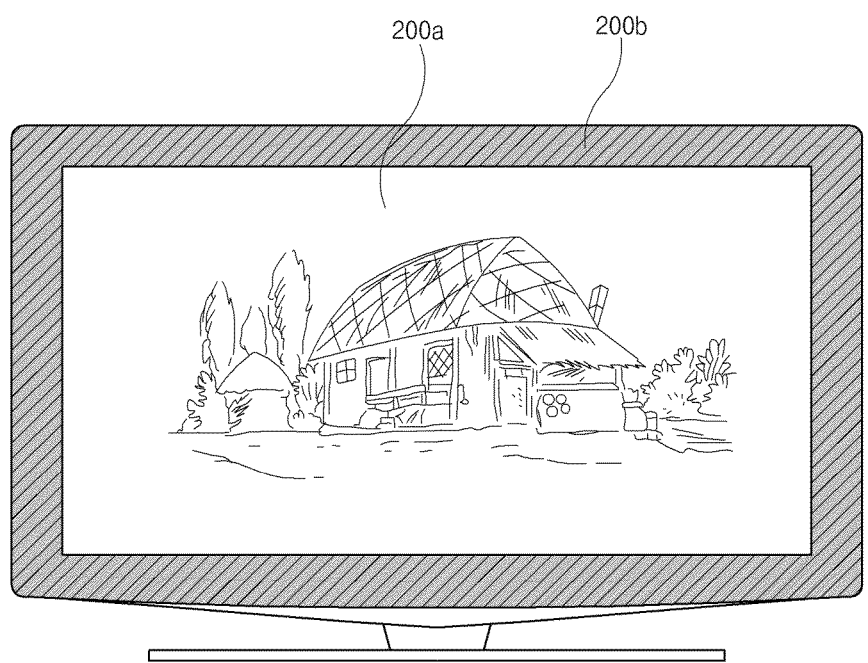
FIG. 7 is a top view of the display device according to the first embodiment.

FIG. 7 is a top view of the display device according to the first embodiment. The display device has the display area 200a for display images and the bezel area disposed along the edges of the display area 200a.

As explained above, the patterns or designs with an increased sense of beauty can be seen in the bezel area 200b. That is, since the sub frame 101 has at least one color and the patterns of the main frame 102 appear on the sub frame 101, it is possible to form various designs on the bezel area 200b.

It will be apparent to those skilled in the art that various modifications and variations can be made in the present invention without departing from the spirit or scope of the invention. Thus, it is intended that the present invention cover the modifications and variations of this invention provided that they come within the scope of the appended claims and their equivalents.

What is claimed is:

1. A display device, comprising:
   a display panel having a display area and a bezel area formed around edges of the display area;
   a backlight unit disposed on a rear side of the display panel to provide light to the display panel;
   a supporting member to support the display panel and the backlight unit; and
   a top case having at least one joint and incorporated with a surface of the supporting member, wherein the top case has a main frame combined with the supporting member, and a sub frame having a design of at least one color and disposed on the bezel area,
   wherein the main frame of the top case includes a plurality of separate metal plates connected to each other at the at least one joint to surround the display panel and the supporting member, and
   wherein the main frame is made of metal and has a patterned design on its surface, the patterned design comprising a randomly spaced plurality of uneven craters formed by a chemical surface treatment process of the main frame;
   a thermoplastic resin of the sub frame incorporated with the metal of the main frame, the patterned design on the surface of the main frame thereby being shown on the surface of the thermoplastic resin and the separate metal plates being firmly combined by the sub frame.

2. The device according to claim 1, wherein the sub frame is bonded to the main frame by an injection molded thermoplastic resin.

3. The device according to claim 1, wherein the sub frame is bonded to the main frame on the bezel area.

4. The device according to claim 1, wherein the sub frame of the top case includes a uniform thickness.

5. The device according to claim 1, wherein the supporting member has a bottom cover to accommodate the display panel and the backlight unit, and a main support to fix positions of the display panel and the backlight unit.

6. The device according to claim 1, further comprising a pad to absorb impact and to protect the display panel from dust, the pad positioned between the display panel and the backlight unit and adjacent to the supporting member.

7. The display device according to claim 1, wherein the metal plates are firmly combined by the sub frame formed of the thermoplastic resin disposed on top surfaces of the metal plates.

8. The display device according to claim 1, wherein the connected metal plates define an opening with the display panel disposed in the opening.

9. The display device according to claim 1, wherein the thermoplastic resin of the sub frame includes the at least one color.

10. The display device according to claim 1, wherein the main frame is straight-bar shaped or a reversed L shape.

11. The device according to claim 9, wherein the thermoplastic resin includes at least one pigment or dye, wherein the pigment is at least one of carbon black, titan white, and chrome yellow, and the dye is a soluble dye including at least one of oil yellow, oil blue, and oil red.

12. A method of manufacturing a display device, the method comprising:
    forming a display panel having a display area and a bezel area formed around edges of the display area;
    forming a backlight unit disposed on a rear side of the display panel to provide light to the display panel;
    forming a supporting member to support the display panel and the backlight unit;
    forming a top case having at least one joint and incorporated with a surface of the supporting member, wherein the top case has a main frame combined with the supporting member, and a sub frame having a design of at least one color and disposed on the bezel area,
    wherein the main frame of the top case includes a plurality of separate metal plates connected to each other at the at least one joint to surround the display panel and the supporting member, and is made of metal; and
    forming a patterned design on the surface of the main frame, the patterned design comprising a random plurality of uneven craters, the random plurality of uneven craters formed by a chemical surface treatment process including:
    pretreating the surface of the main frame; and
    after the pretreating, treating the surface of the main frame with an aqueous solution including at least one of ammonia, hydrazine, pyridine, hydrazine derivative, and aqueous amino compounds,
    wherein the pretreating the surface of the main frame includes:
    applying an alkaline aqueous solution of 0.1 to 10% concentration, wherein the alkaline aqueous solution is an alkali metal hydroxide including at least one of sodium hydroxide, potassium hydroxide, anhydrous sodium carbonate, and ammonia; and
    applying an acid aqueous solution of 0.1 to 1% concentration, the acid aqueous solution including acetic acid or hydrofluoric acid.

13. The method of claim 12, wherein the surface of the main frame is not provided with a mask pattern prior to the chemical surface treatment process.

14. A method of manufacturing a display device, the method comprising:
    forming a display panel having a display area and a bezel area formed around edges of the display area;

forming a backlight unit disposed on a rear side of the display panel to provide light to the display panel;

forming a supporting member to support the display panel and the backlight unit;

forming a top case having at least one joint and incorporated with a surface of the supporting member, wherein the top case has a main frame combined with the supporting member, and a sub frame having a design of at least one color and disposed on the bezel area, wherein the main frame of the top case includes a plurality of separate metal plates connected to each other at the at least one joint to surround the display panel and the supporting member, and is made of metal; and forming a patterned design on the surface of the main frame, the patterned design comprising a random plurality of uneven craters, the random plurality of uneven craters formed by a chemical surface treatment process including:

pretreating the surface of the main frame; and after the pretreating, treating the surface of the main frame with an aqueous solution including at least one of ammonia, hydrazine, pyridine, hydrazine derivative, and aqueous amino compounds, wherein the pretreating the surface of the main frame includes:

applying an aqueous solution of reducing agents of 1 to 5% concentration, wherein the reducing agents include at least one of alkali metal sulfite, alkali metal bisulphate, hydrazine, sodium boron hydride, and lithium aluminum hydride.

15. The method of claim 14, wherein the surface of the main frame is not provided with a mask pattern prior to the chemical surface treatment process.

\* \* \* \* \*